(12) United States Patent  (10) Patent No.: US 7,149,899 B2
Pinkas et al.  (45) Date of Patent: Dec. 12, 2006

(54) ESTABLISHING A SECURE CHANNEL WITH A HUMAN USER

(75) Inventors: Binyamin Pinkas, Jersey City, NJ (US); Stuart A. Haber, New York, NY (US); Robert E. Tarjan, Princeton, NJ (US); Tomas Sander, New York, NY (US)

(73) Assignee: Intertrust Technologies Corp., Sunnyvale, CA (US)

( * ) Notice: Subject to any disclaimer, the term of this patent is extended or adjusted under 35 U.S.C. 154(b) by 702 days.

(21) Appl. No.: 10/423,546

(22) Filed: Apr. 25, 2003

(65) Prior Publication Data

US 2004/0073813 A1 Apr. 15, 2004

Related U.S. Application Data

(60) Provisional application No. 60/375,021, filed on Apr. 25, 2002.

(51) Int. Cl.
*G06F 9/00* (2006.01)

(52) U.S. Cl. ............... 713/182; 713/181; 713/193
(58) Field of Classification Search ........... 713/182, 713/181, 193
See application file for complete search history.

(56) References Cited

U.S. PATENT DOCUMENTS

| | | | |
|---|---|---|---|
| 4,827,508 A | 5/1989 | Shear | |
| 4,977,594 A | 12/1990 | Shear | |
| 5,050,213 A | 9/1991 | Shear | |
| 5,124,117 A * | 6/1992 | Tatebayashi et al. | 380/281 |
| 5,150,411 A * | 9/1992 | Maurer | 380/30 |
| 5,410,598 A | 4/1995 | Shear | |
| 5,530,235 A | 6/1996 | Stefik et al. | |
| 5,534,975 A | 7/1996 | Stefik et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,630 A * | 7/1999 | Wertheimer et al. | 380/286 |
| 5,920,861 A | 7/1999 | Hall et al. | |
| 5,940,504 A | 8/1999 | Griswold | |

(Continued)

FOREIGN PATENT DOCUMENTS

EP  0 715 247 A1  6/1996

(Continued)

OTHER PUBLICATIONS http://www.captcha.net, 3 pages, 2000.

(Continued)

*Primary Examiner*—Thomas R. Peeso
(74) *Attorney, Agent, or Firm*—Finnegan, Henderson, Farabow, Garrett & Dunner LLP

(57) ABSTRACT

A method of establishing a secure channel between a human user and a computer application is described. A secret unique identifier ("PIN") is shared between a user and an application. When the user makes a request that involves utilizing the PIN for authentication purposes, the application renders a randomly selected identifier. The randomly selected identifier is in a format that is recognizable to a human but is not readily recognizable by an automated agent. The randomly selected identifier is then presented to the human user. The user identifies the relationship between the randomly selected identifier and the PIN. If the user's input reflects the fact that the user knows the PIN, then the user is authenticated.

14 Claims, 6 Drawing Sheets

U.S. PATENT DOCUMENTS

| | | |
|---|---|---|
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,112,181 A | 8/2000 | Shear et al. |
| 6,138,119 A | 10/2000 | Hall et al. |
| 6,157,721 A | 12/2000 | Shear et al. |
| 6,185,683 B1 | 2/2001 | Ginter et al. |
| 6,195,698 B1 | 2/2001 | Lillibridge et al. |
| 6,209,093 B1 * | 3/2001 | Venkatesan et al. ........ 713/176 |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,363,488 B1 | 3/2002 | Ginter et al. |
| 6,389,402 B1 | 5/2002 | Ginter et al. |
| 6,427,140 B1 | 7/2002 | Ginter et al. |
| 6,449,367 B1 | 9/2002 | Van Wie et al. |
| 6,618,484 B1 | 9/2003 | Van Wie et al. |
| 6,640,304 B1 | 10/2003 | Ginter et al. |
| 6,658,568 B1 | 12/2003 | Ginter et al. |
| 6,668,325 B1 | 12/2003 | Collberg et al. |
| 6,785,815 B1 | 8/2004 | Serret-Avila et al. |
| 6,832,316 B1 | 12/2004 | Sibert |
| 2001/0042043 A1 | 11/2001 | Shear et al. |
| 2002/0023214 A1 | 2/2002 | Shear et al. |
| 2002/0048369 A1 | 4/2002 | Ginter et al. |
| 2002/0087859 A1 | 7/2002 | Weeks et al. |
| 2002/0112171 A1 | 8/2002 | Ginter et al. |
| 2002/0152173 A1 | 10/2002 | Rudd |
| 2003/0023856 A1 | 1/2003 | Home et al. |
| 2003/0041239 A1 | 2/2003 | Shear et al. |
| 2003/0046244 A1 | 3/2003 | Shear et al. |
| 2003/0069748 A1 | 4/2003 | Shear et al. |
| 2003/0069749 A1 | 4/2003 | Shear et al. |
| 2003/0084003 A1 | 5/2003 | Pinkas et al. |
| 2003/0105721 A1 | 6/2003 | Ginter et al. |
| 2003/0163431 A1 | 8/2003 | Ginter et al. |
| 2004/0054630 A1 | 3/2004 | Ginter et al. |
| 2004/0059951 A1 | 3/2004 | Pinkas et al. |
| 2004/0103305 A1 | 5/2004 | Ginter et al. |
| 2004/0107356 A1 | 6/2004 | Shamoon et al. |
| 2004/0123129 A1 | 6/2004 | Ginter et al. |
| 2004/0133793 A1 | 7/2004 | Ginter et al. |
| 2005/0027871 A1 | 2/2005 | Bradley et al. |
| 2005/0050332 A1 | 3/2005 | Serret-Avila et al. |
| 2005/0060560 A1 | 3/2005 | Sibert |
| 2005/0060584 A1 | 3/2005 | Ginter et al. |

FOREIGN PATENT DOCUMENTS

| | | |
|---|---|---|
| WO | WO 96/27155 | 9/1996 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Lamport, L., "Password Authentication with Insecure Communications," Communications of the ACM, Nov. 1981, pp. 770-772, 24(11).

Naor, M. et al., "Visual Authentication and Identification," Crypto, 1997.

Sibert, O. et al., "Digibox: A Self-Protecting Container for Information Commerce," Proceedings of the First USENIX Workshop on Electronic Commerce, Jul. 1995, 13 pages, New York, NY.

Sibert, O. et al., "Securing the Content, Not the Wire, for Information Commerce," 1996, 12 pages, InterTrust Technologies Corporation.

Stefik, M., "Introduction to Knowledge Systems, Chapter 7: Classification," 1995, pp. 543-607, Morgan Kaufmann Publishers, Inc., San Francisco, CA.

Stefik, M., "Letting Loose the Light: Igniting Commerce in Electronic Publication," 1994-1995, 35 pages, Xerox PARC, Palo Alto, CA.

Stefik, M., "Letting Loose the Light: Igniting Commerce in Electronic Publication," Internet Dreams: Archetypes, Myths, and Metaphors, 1996, pp. 219-253, Massachusetts Institute of Technology.

Stefik, M., "Trusted Systems," Scientific American, Mar. 1997, pp. 78-81.

Von Ahn, Luis et al., "CAPTCHA: Using Hard AI Problems For Security," Proc., EuroCrypt 2003, Warsaw, Poland, May 4-8, 2003, 18 pages.

* cited by examiner

ESTABLISHING A SECURE CHANNEL WITH A HUMAN USER

RELATED APPLICATIONS

This application claims the benefit of U.S. Provisional Application No. 60/375,021 entitled "Establishing a Secure Channel with a Human User," filed Apr. 25, 2002, which is hereby incorporated by reference in its entirety.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to establishing a secure channel with a user in a non-secure environment, and more particularly to systems and methods for establishing a secure channel to protect against computerized eavesdroppers by utilizing messages that are easily understood by humans, but are relatively hard for computational processes to decipher.

BACKGROUND

Authentication and identification are two central problems surrounding payment systems, cryptography, and the Internet. In most security applications that require human authentication or identification, a secure application (either local or remote) will need to obtain input from a human user. In particular, the input could be a personal identification number ("PIN") or some other type of password. The PIN is a mechanism that tells the secure application that this is the correct person and will allow access or permit a transaction. Many times the communication between the application and the user may occur over an insecure channel. For example, the user's input may be entered using a computer keyboard, and the information sent to the application. Rogue applications or computer "hackers" can eavesdrop on this channel and could possibly obtain the user's PIN. This is especially relevant with regard to debit card transactions, where the PIN is the major identifier of the customer's identity. In order to have security for these types of transactions the PIN should not be sent in the clear.

One solution to this problem is to require the user to have a secure computational device that receives the PIN from the user and sends it in encrypted form to the application. Although this is an effective mechanism, it is less than optimal since it necessitates the use of an external hardware device.

Another solution is to use biometric identification. For example, retinal scans and fingerprinting have been used to determine identities with almost perfect certainty. However, these processes can be extremely expensive to set up and maintain.

Another solution is to require the human user to carry a small transparency with encoded data. See, e.g., Naor et al., "Visual Authentication and Identification," *Crypto* (1997). The user identification process is composed of the following steps: (1) the application sends a random looking image to a display; (2) the user puts his transparency on top of the display; and (3) the combination of the displayed image and the transparency is read by the user but is unknown to an adversary that does not have the transparency. The user identifies himself/herself by sending an answer, which is a function of the combined image. This solution is also less than perfect since the user would have to carry around physical transparencies.

Yet another solution is to use a one-time password that expires after use. See, e.g., Lamport, "Password authentication with insecure communications," *Communications of the ACM,* 24(11) (November 1981). A problem with this mechanism is that a user needs to constantly obtain new passwords for the purposes of authentication. One could imagine the problems associated with receiving new PIN numbers from your bank every time you wanted to withdraw cash from an ATM machine.

Still another solution is to use a challenge-response protocol in which the user and computer have a shared secret whereby the computer could ask the user a question that has a pre-defined answer (e.g., mother's maiden name). The user would respond with the answer and, if the correct answer is supplied, access may be granted. This system, however, does not solve the ultimate problem of sending authenticating information over an insecure channel. Once this information is sent "in the clear," it can be copied and used to impersonate the real user.

The present invention provides systems and methods where a secure application can authenticate the identity of a human using a shared unique identification in combination with a randomly selected identification that is rendered to the user.

SUMMARY OF THE INVENTION

Methods and systems of establishing a secure channel between a human user and a computer application are described. In accordance with one embodiment of the invention, a method is provided for establishing a secure channel between a user and a computer application. The method is performed by rendering to the user a randomly selected identifier; receiving input from the user based on both the randomly selected identifier and a secret identifier associated with the user; determining, based on the input whether the user demonstrates knowledge of the secret identifier; and authenticating or not authenticating the user based upon the outcome of said determining step.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment, but instead encompasses numerous alternatives, modifications, and equivalents. For example, while embodiments are described in the context of a system and method for creating a secure channel with a human user over a computer network, those skilled in the art will recognize that the disclosed systems and methods are readily adaptable for broader application. For example, without limitation, the present invention could be readily applied in the context of wireless communications, non-remote computer applications, or for virtually any authentication purposes. In addition, while numerous specific details are set forth in the following description in order to provide a thorough understanding of the present invention, the present invention may be practiced without some or all of these details. Moreover, for the purpose of clarity, certain technical material that is known in the art related to the invention has not been described in detail in order to avoid unnecessarily obscuring the present invention.

Figure 1:
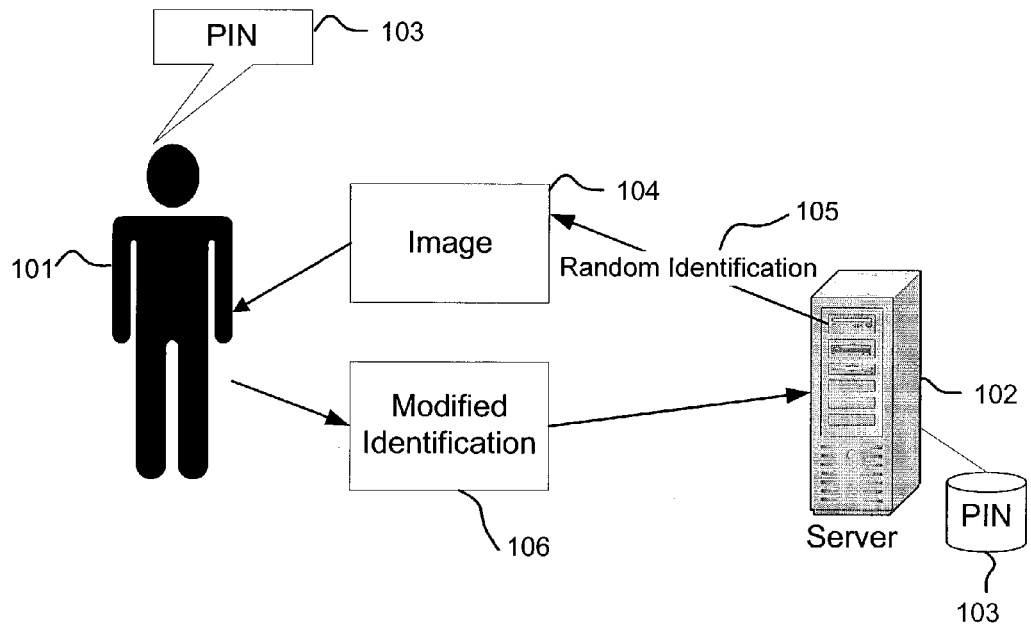
FIG. 1 illustrates an exemplary system for creating a secure channel between a user and a secure application.

Referring more particularly to FIG. 1, an exemplary system of establishing a secure channel between a human user 101 and an application 107 running on a computer system 102 is shown. In this exemplary embodiment, a unique identifier (PIN 103) is generated that is associated with a user 101. The PIN 103 is shared between the user 101 and the application. To authenticate a user, the application generates randomly a selected identifier 105 in the form of an image 104. The image is in a format that is recognizable to a human but is not readily recognizable by an automated agent. In one embodiment, the image is the result of a Reverse Turing Test ("RTT"). Generally speaking, a RTT is a test that attempts to distinguish between a human user and an automated program. The image generated by the test should be relatively easy for humans to identify, yet difficult for computer programs to guess correctly. An example of an RTT for use with the invention is one that displays a convoluted graphical image of an alphanumeric character string and asks the user to interact with the image (the size of the image is typically between 6 K to 30 K bytes, however other sizes my be used depending upon the particular application). Examples of RTTs, as well as source code, are available at http://www.captcha.net.

The image 104 is then presented to the user 101. The user identifies the difference between the randomly selected identifier 105 and the PIN 103 and inputs the difference (or some other predefined relationship) between the value of the randomly selected identifier 105 and the PIN 103 (i.e., a modified identifier). The secure application 107 then compares the modified identifier 106 with PIN 103 to determine if the modified identifier 106 corresponds to PIN 103. If the modified identifier reflects the fact that the user 101 knows PIN 103, then the user is authenticated.

Figure 2:
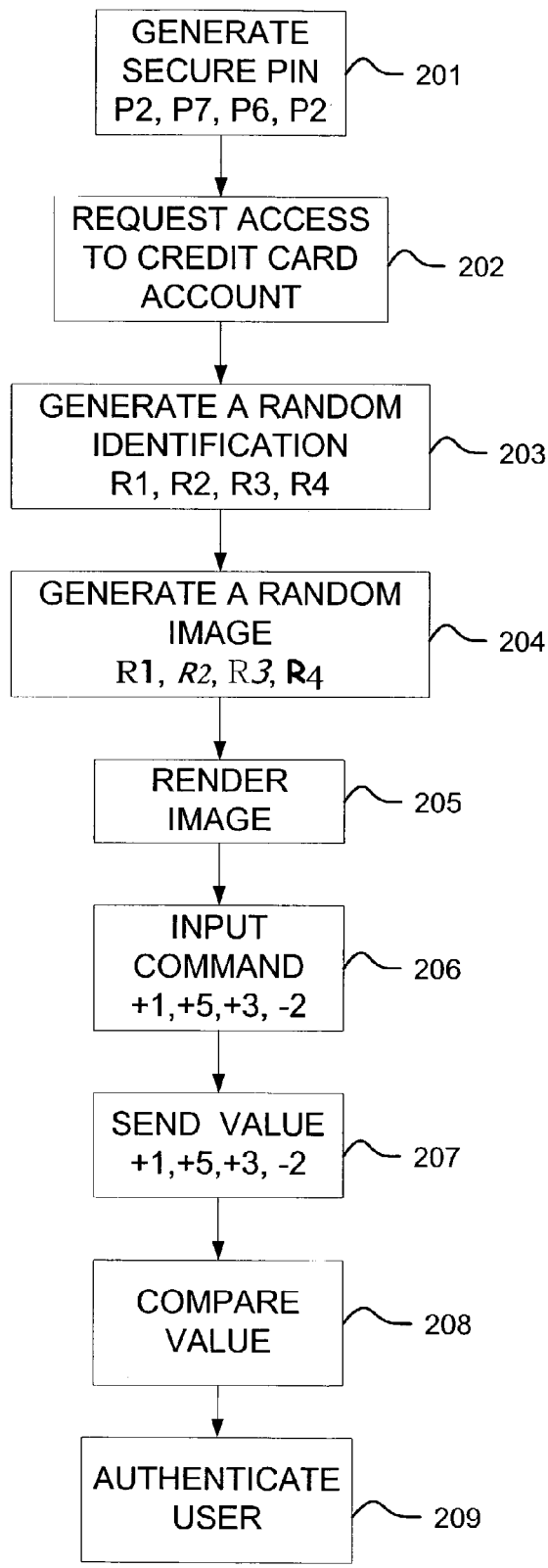
FIG. 2 illustrates a method for authenticating a user using a secure application, consistent with the present invention.

FIG. 2 illustrates in greater detail an exemplary method of creating an image and establishing authentication. In step 201, a secure PIN is generated that is attributable to a user. The PIN is held in secret and is known by both the secure application 107 and the user 101. In this example, the secret PIN is P2, P7, P6, P2. In step 202, an operation is requested of the secure application 107 (e.g., a request to access a credit card account via a cell phone, bank account, Paypal account, telephone service, internet service or any other service, account, or facility (e.g., building)). In step 203, the secure application 107 generates a random identifier. In this example, the random identifier is R1, R2, R3, R4. In step 204, a random image is created that is comprised of the random identifier in a format that is understandable to the user but not easily understandable to an unauthorized application. In step 205, the image is rendered to the user through a display device.

The random image could, for example, be rendered in varying font sizes and/or styles—e.g., R1, R2, R3, R4. Alternatively, or in addition, the random identifier could be rendered such that spacing between characters was varied depending on the size of the character, the distance from a baseline to the character, and/or any other suitable criteria. Some of the characters could be rendered close enough together so that they partially intersect. Each character, as well as the entire random identifier, could be stretched or distorted randomly in any number of ways. The random identifier could follow a random path. For example, rather than being presented in a straight path, the characters of the random identifier could appear in a curved path (e.g., along a path shaped like the letter W, V or C). The random identifier could be rotated randomly around a randomly selected point; e.g., the random identifier might be mirror-reversed. A confusing random background could be used on which the random identifier was overlaid. The characters of the random identifier could be rendered in various randomly chosen colors that are visually distinct from the background pattern; for instance the character coloring could use a different maze-type pattern. In another embodiment, the image might display characters on a screen, with each character mapped to a different location. Strange background noises could be used for audio rendering. For a more detailed discussion concerning randomizing the appearance of characters, reference is made to U.S. Pat. No. 6,195,698 to Lillibridge et al., which is hereby incorporated by reference in its entirety. Thus, it will be appreciated that there are many ways to generate a random image or other rendering of an identifier that is relatively easy for a user to interpret but relatively difficult for an automated process to interpret, and that any suitable one or more techniques can be used without departing from the principles of the present invention.

It should be appreciated that the term "render" is not intended to be limited to visual display devices, one of ordinary skill in the art will recognize that humans are capable of perceiving information from a variety of sensory perceptions including sight, sound, touch, taste, and smell. Similarly, it should be understood that the term "random" is not being used in a narrow mathematical sense, but is, instead, intended to encompass pseudo-random, effectively random, or other relatively non-deterministic or relatively unpredictable processes that are suitable for a given application.

Referring once again to FIG. 2, in step 206 the user provides input which, together with the random image, bears a predefined relationship to the PIN. In the example shown in FIG. 2, the user computes the difference between the values in the PIN and the values in the random identifier (e.g., the user inputs +1, +5, +3, −2). In other embodiments, the secure application may send a random identifier that only changes one value, thereby requiring only one command value to be made. In some embodiments, the user may be supplied with a touch keypad having up and down arrows next to each digit that could be used to "click" each digit incrementally until the digits represent the PIN. In other embodiments voice recognition may be used or any other suitable mechanism for inputting changes or commands to a system. In step 207, the value/values +1, +5, +3, −2 is/are sent to the secure application (the values could be sent independently and/or collectively). In step 208, the secure application compares the value +1, +5, +3, −2 to the PIN to determine if the at least one value corresponds to the unique identifier; in this case by adding 1 to R1, adding 5 to R2, adding 3 to R3 and subtracting 2 from R4, the correct PIN P2, P7, P6, P2 is calculated. Because the correct PIN was calculated, the user is authenticated in step 209. The system is secure since the image that is displayed to the user is random and is preferably used effectively only once, and cannot be easily read by an automated adversary. In this embodiment, the PIN entry process may be viewed as an encryption with a onetime pad (which provably does not provide information about the PIN).

Figure 3:
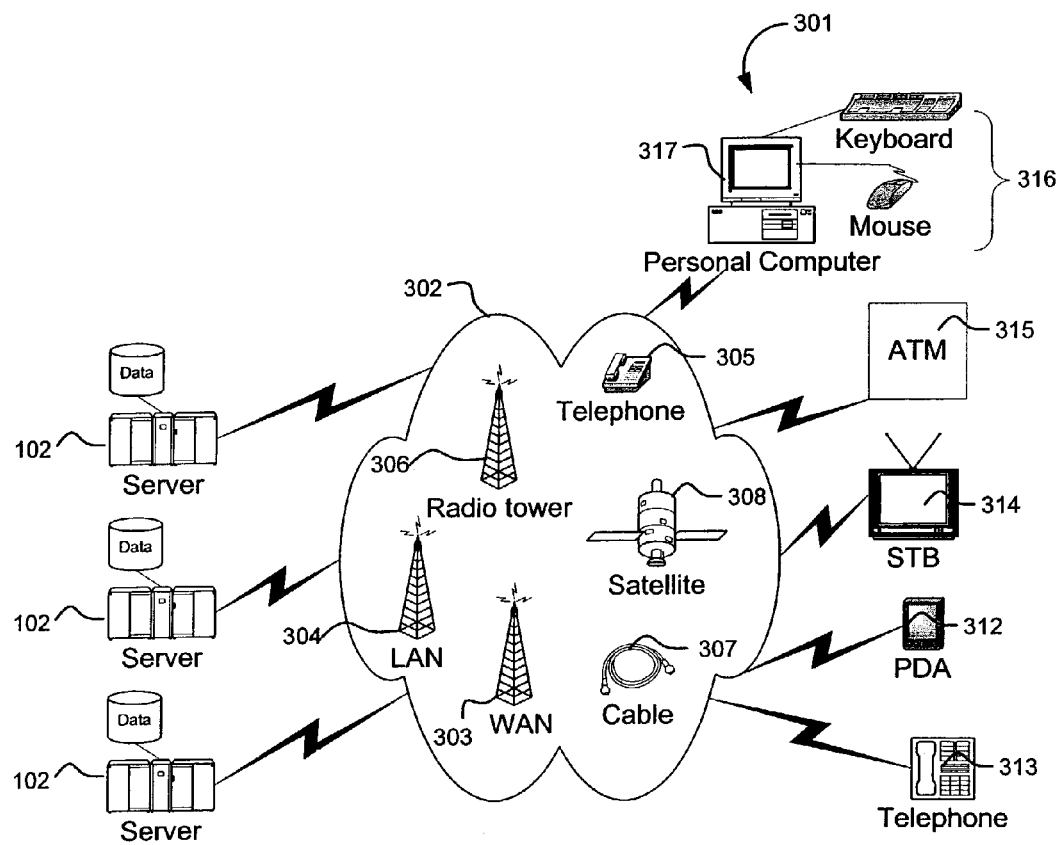
FIG. 3 illustrates another embodiment of the present invention where a network of end user computers/applications are connected to server computers/secure applications by way of a network, consistent with the present invention.

FIG. 3 illustrates another embodiment of the present invention where a network of end user computers/applications 301 is connected to server computers/secure applications 102 by way of a network. Network 302 may comprise any network, including, but not limited to wide-open networks ("WAN") 303 such as the Internet, local are networks ("LAN") 304, telephone 305, radio 306, cable 307, satellite 308, and/or other network architectures. Moreover, it will be appreciated that embodiments of the present invention can also be practiced in non-networked environments (e.g., for user authentication to a local computer system, wherein the local computer system performs the roles of both the servers and the clients shown in FIG. 3). The end user computer 301 could be any type of end user device including but not limited to: personal computers ("PCs") 311, personal digital assistant ("PDAs") 312, cellular phones 313, set top boxes ("STBs"), laptop computers, workstations, ATM machines 315 or any other device configured for receiving and sending information. Most end user devices have some type of input device 316, for example keyboards, mouses, keypads, audio interfaces, stylus with a digitizer pad, or any other type of interface that enables a user to convey information. Lastly, the end user computer typically has some type of display mechanism 317, for example, speakers, cathode ray tube screens, liquid crystal display screens or any other mechanism to convey information to an end user.

The method for authenticating the human user is created by generating a PIN that is attributable to the user. A PIN can be generated in numerous ways and for numerous purposes, however one of ordinary skill in the art can appreciate the multitude of scenarios that require a PIN for authentication purposes, such as for example, ATM transactions, "booting-up" personal computers, accessing information in personal handheld devices, accessing information in telephones, creating and accessing all types of Internet, set-top box, Telco, cable, credit card and Pay-Pal™ accounts, and gaining access to buildings, vaults, or other secure areas. These are merely examples of some of the instances that require use of a PIN and are not intended to be completely comprehensive. In addition, the term "personal identification number," or PIN, is not intended to be a limiting term encompassing only numbers; rather, it is intended to mean any type of generic password or identification technique. The PIN could be comprised of numbers, letters, symbols or any combination of the foregoing. In at least one embodiment, both the secure application and the user share the PIN.

Figure 4:
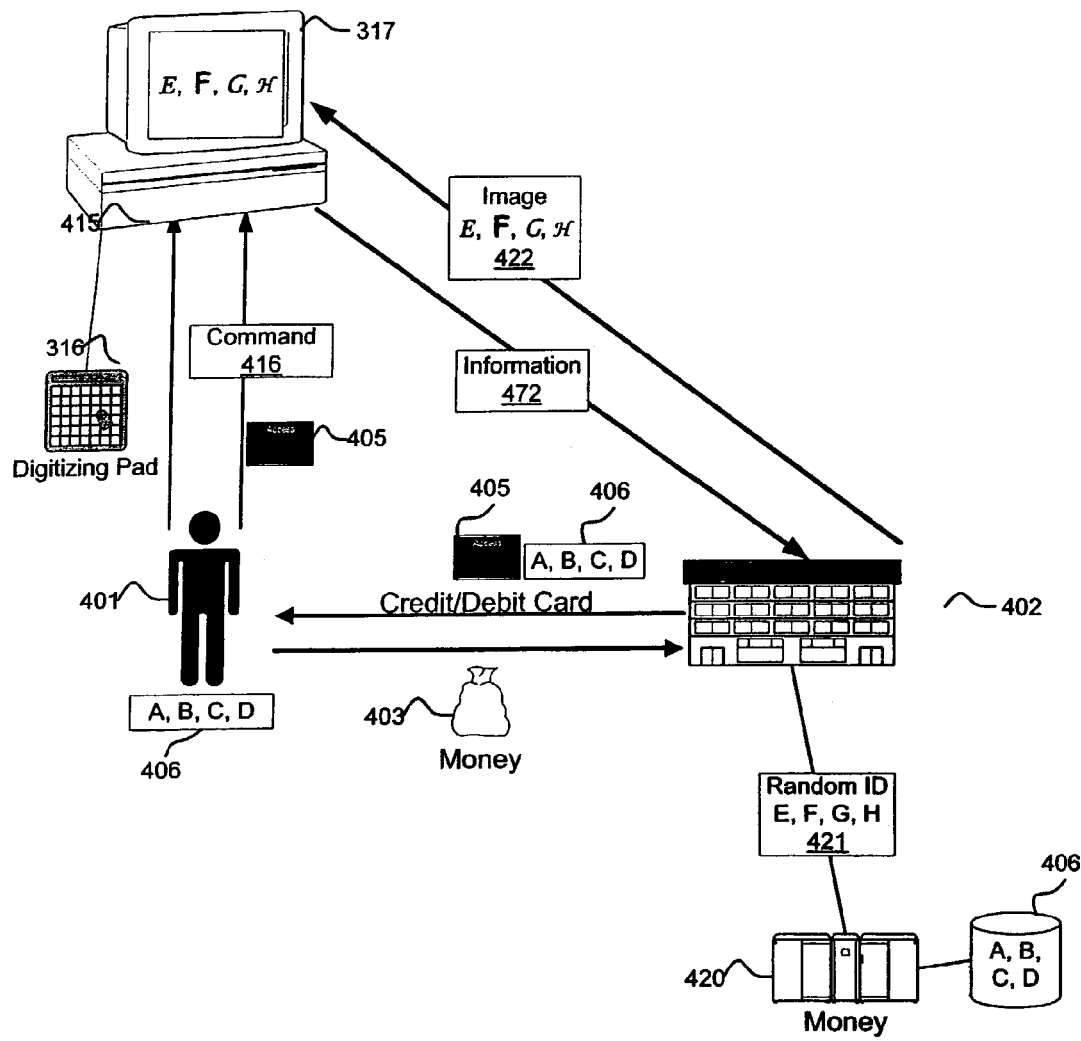
FIG. 4 illustrates a method of obtaining a PIN from a financial institution and creating a secure channel, consistent with the present invention.

FIG. 4 illustrates a method of obtaining a PIN from a financial institution and creating a secure channel. Typically, a user 401 sets up an account with the financial institution 402 by placing money 403 into a checking account. Once the money 403 is deposited into the account, the institution 402 will send a bankcard 405 and a PIN 406 to the user 401. In this illustrative embodiment, a computer system 420 at the bank 402 shares the PIN with the user (the PIN being A, B, C, D). When the user 401 desires to withdraw money 403 from his or her bank account, s/he may choose to use an ATM machine 415. The user typically uses a bankcard 405 having a magnetic strip to initiate the withdrawal. The bankcard 405 is "swiped" through the ATM machine 415 initiating a transaction. Once the ATM machine 415 obtains the information 472 from the bankcard 405, a secure application (running on the ATM and/or one or more remote computer systems such as computer system 420) creates a randomly generated identifier 421 that is presented in a format, image, or sequence 422 that is understandable to the user but not easily understandable to an unauthorized application. In FIG. 4, the randomly generated identifier is E, F, G, H. The image is then sent to a display or rendering device 317. The user interprets the image (i.e., looks at the image and/or listens to the audio sounds) and determines the difference between the image and the PIN 406. The user then enters the difference between the value of the randomly generated identifier 421 sent in the image 422 and the value of the characters in the PIN 406. In the context of FIG. 4, for example, the user could return, for each character, −4, −4, −4, −4, representing the incremental difference necessary to reduce the value of the randomly generated identifier (i.e., E, F, G, H) to the value of the PIN 406 (i.e., A, B, C, D). The values are then analyzed to determine if they demonstrate knowledge of the PIN.

Figure 5:
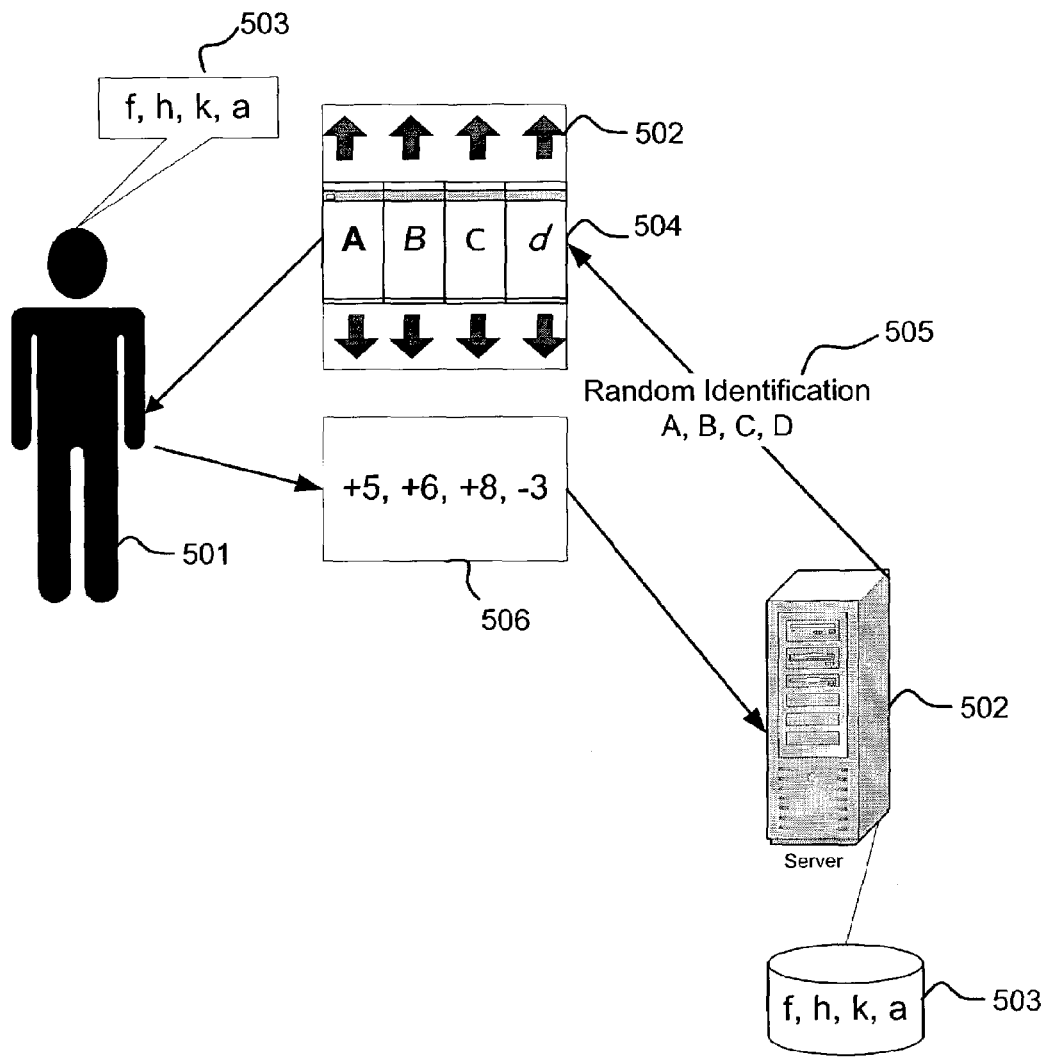
FIG. 5 is a block diagram of another example of an application for performing user authentication, consistent with the present invention.

FIG. 5 shows an example embodiment wherein an image 504 is presented using a program that displays "up" and "down" input(s) 502 next to the displayed character(s). Initially, a secret unique identifier (PIN 503) is generated that is assignable to a unique user 501. The PIN is shared between the user 501 and the application 502. When a request is made that involves utilizing the PIN 503 for authentication purposes, the application generates an image 504 that is comprised of a randomly selected identifier 505. The image 504 is in a format that is recognizable to a human but is not readily recognizable by an automated agent. In FIG. 5, for example, the font and case have been changed, however, any suitable mechanisms for "morphing" the randomly selected identifier 505 could be used, such as those discussed above in connection with FIG. 2. The image 504 is then presented to the human user 501. The user identifies the difference between the randomly selected identifier 505 and the unique identifier 503 and changes the value of the randomly selected identifier 505 into a modified identifier 506 by "clicking" the arrows to increase or decrease each digit or value. Alternatively, the user may be selecting different images, characters, or sounds. The user should click the arrows until modified identifier corresponds to his PIN 503. In this illustrative embodiment, the application or input device sends back the number of times the user "clicked" on each button. The secure application then compares the modified identifier 506 with the unique identifier 503 to determine if the modified identifier 506 corresponds to the unique identifier 503. If the modified identifier reflects the fact that the user 501 knows the PIN 503, then the user is authenticated. The system is secure since the image that is displayed to the user is random and is used only once, and it is not easily readable by an automated adversary.

Figure 6:
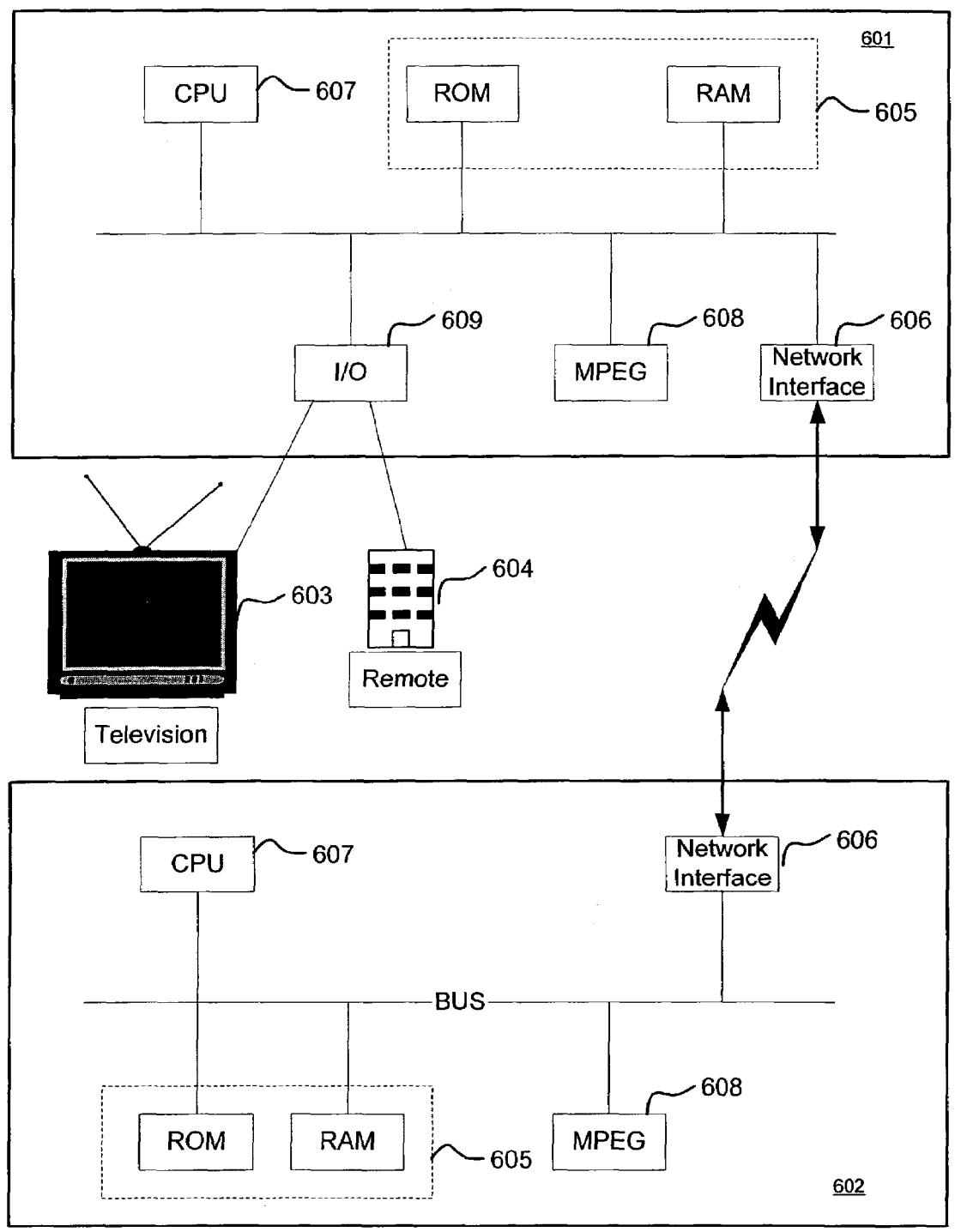
FIG. 6 is a block diagram illustrating a secure system for receiving proprietary information, consistent with the present invention.

FIG. 6 provides a more detailed illustration of a system that could be used to practice embodiments of the present invention. The example system shown in FIG. 6 is comprised of an end user system 601 and a server 602. The end user system 601 includes a rendering device 603 (such as a monitor, speakers, and/or the like), an input device 604 (such as a mouse, keyboard, remote control, and/or the like), memory 605 (such as RAM, ROM, magnetic or optical disk, etc), an input/output ("I/O") interface 609, a network interface 606, and a processor ("CPU") 607. As shown in FIG. 6, server 602 can be implemented with a similar set of components. For example, server 602 might include memory 605 that stores sequences of instructions that are executed by its processor 607. In some embodiments, system 601 and/or 602 can be configured to be adaptable for set-top-boxes with MPEG-4 certified hardware and software components through I/O 609. In some embodiments the rendering device 603 and the input device 604 may be integral, for example a touch kiosk. In sum, one of ordinary skill in the art should appreciate that the system shown in FIG. 6 is provided for purposes of illustration, and that other systems with additional, fewer, or alternative components could be used for purposes of implementing the systems and methods described herein.

In one embodiment, the memory 605 stores information concerning a unique PIN that is associated with a human user and instructions that are followed in response to a request for the PIN. The processor 607 is configured for executing the instructions stored in the memory. In response to a request to generate a PIN the processor 607 generates a random identifier figure; generates an image of the random identifier figure that is readable by the human user but is difficult to read by an automated agent; sends the image to the display 603; receives information from the display 603 which represents the difference between the value of the image sent and the value of the PIN and determines if the difference between the value of the image sent corresponds to the value of the PIN. If the values are the same, then the human is authenticated. The system is secure since the image that is displayed to the user over the display is random and used only once. The PIN is not sent over the insecure channel or displayed; therefore an automated adversary cannot read the PIN.

In another illustrative embodiment, instead of having the user's response be equal to the "difference" between the parsed image and the PIN or password, the response may be any specified computation (that a human user can easily perform) that depends on these two inputs. For example, if the system is implemented using alphabetic passwords, users may have trouble calculating the exact offset or difference between a displayed character and a character in their password. Without any loss in security, the present invention can display to the user a look-up table giving the offsets between all possible pairs of letters.

In another embodiment using a numeric PIN, a user clicks on a sequence of "up" and "down" buttons in order to change a displayed sequence of digits to his own PIN. The local software can simply collect the sequence of clicks—e.g. (+1, +5, +3, −2) (not unlike the embodiment described in connection with FIG. 2) and sends this sequence back to the server, without changing the display. In another embodiment, the user display changes with each click, until the user is satisfied.

In another embodiment, the server has a mapping from locations in the image to values. For example, the image might display characters, and the server could know how to associate different locations in the image with different characters. The user points, in order, to the locations in the image that correspond to the characters of the PIN.

The present invention can be used not just as a login mechanism, but also as a general mechanism for secure communication, between a human user and a secure application or server. That is, it can be used to send other messages besides PINs in a secure manner. The present invention was designed so that its security would support its use many times.

Although the foregoing invention has been described in some detail for purposes of clarity, it will be apparent that certain changes and modifications may be made without departing from the principles of the present invention. It should be noted that there are many alternative ways of implementing both the processes and apparatuses of the present invention. Accordingly, the present embodiments are to be considered as illustrative and not restrictive, and the invention is not to be limited to the specific details given herein.

We claim:

1. A method of establishing a secure channel between a user and a computer application comprising:
    rendering to the user a randomly selected identifier;
    receiving input from the user based on both the randomly selected identifier and a secret identifier associated with the user, wherein the user inputs a sequence of data, the sequence of data indicating the difference between the secret identifier and the randomly selected identifier;
    determining, based on the input whether the user demonstrates knowledge of the secret identifier; and
    authenticating or not authenticating the user based upon the outcome of said determining step.

2. A method of establishing a secure channel between a user and a computer application comprising:
    rendering to the user a randomly selected identifier;
    receiving input from the user based on both the randomly selected identifier and a secret identifier associated with the user, wherein the input represents a series of locations on the randomly selected identifier, the locations indicating the secret identifier;
    determining, based on the input whether the user demonstrates knowledge of the secret identifier; and
    authenticating or not authenticating the user based upon the outcome of said determining step.

3. A method of establishing a secure channel between a user and a computer application comprising:
    rendering to the user a randomly selected identifier, wherein the randomly selected identifier is rendered as an image generated by a Reverse Turing Test (RTT);
    receiving input from the user based on both the randomly selected identifier and a secret identifier associated with the user;
    determining, based on the input whether the user demonstrates knowledge of the secret identifier; and
    authenticating or not authenticating the user based upon the outcome of said determining step.

4. A method of establishing a secure channel between a user and a computer application comprising:

rendering to the user a randomly selected identifier, wherein the randomly selected identifier is rendered as an image formatted using various styles;

receiving input from the user based on both the randomly selected identifier and a secret identifier associated with the user;

determining, based on the input whether the user demonstrates knowledge of the secret identifier; and authenticating or not authenticating the user based upon the outcome of said determining step.

5. A method for authenticating a user with a secure application in an insecure environment comprising the steps of:

generating a PIN that is associated with the user, the PIN being known by both the secure application and the user;

requesting an operation such that the secure application renders a randomly generated identifier;

sending the randomly generated identifier to a display device, which displays the randomly generated identifier to the user;

receiving input in the form of at least one command such that at least one value is attributed to the at least one command, the at least one value having a relationship to the PIN;

sending the at least one value to the secure application, wherein the secure application compares the at least one value to the PIN to determine if the at least one value corresponds to the PIN; and if the user input demonstrates knowledge of the PIN authenticating the user; and if the user input does not demonstrate knowledge of the PIN not authenticating the user.

6. The method of claim 5, wherein the command represents a relationship between the PIN and the randomly generated identifier.

7. The method of claim 5, wherein the command represents clicks in a sequence, the clicks indicating the difference between the PIN and the randomly generated identifier.

8. The method of claim 5, wherein the command represents a series of locations on the randomly generated identifier, the locations indicating the PIN.

9. The method of claim 5, wherein the randomly generated identifier is used only once.

10. A system for establishing a secure channel from a user to an application over which a PIN can be submitted comprising:

a display;
a memory for storing information concerning the PIN;
a processor configured for executing instructions stored in the memory wherein the memory stores instructions that:
generate a random identifier in response to a request using the PIN;
render the random identifier to the user;
receive information from the user, wherein the information received represents a relationship between the value of the random identifier and the value of the PIN; and
determine if the information received sufficiently demonstrates knowledge of the PIN.

11. A system for establishing a secure channel from a user to an application over which a PIN can be submitted comprising:

a display;
a memory for storing information concerning the PIN;
a processor configured for executing instructions stored in the memory wherein the memory stores instructions that:
generate a random identifier in response to a request using the PIN;
render the random identifier to the user;
receive information from the user, wherein the information received represents clicks in a sequence, the clicks indicating the difference between the value of the random identifier and the value of the PIN; and
determine if the information received sufficiently demonstrates knowledge of the PIN.

12. A system for establishing a secure channel from a user to an application over which a PIN can be submitted comprising:

a display;
a memory for storing information concerning the PIN;
a processor configured for executing instructions stored in the memory wherein the memory stores instructions that:
generate a random identifier in response to a request using the PIN;
render the random identifier to the user;
receive information from the user, wherein the information represents a series of locations on the random identifier, the locations indicating the value of the PIN; and
determine if the information received sufficiently demonstrates knowledge of the PIN.

13. A system for establishing a secure channel from a user to an application over which a PIN can be submitted comprising:

a display;
a memory for storing information concerning the PIN;
a processor configured for executing instructions stored in the memory wherein the memory stores instructions that:
generate a random identifier in response to a request using the PIN;
render the random identifier to the user, wherein random identifier is
rendered as an image generated by a Reverse Turing Test (RTT); receive information from the user; and
determine if the information received sufficiently demonstrates knowledge of the PIN.

14. A system for establishing a secure channel from a user to an application over which a PIN can be submitted comprising:

a display;
a memory for storing information concerning the PIN;
a processor configured for executing instructions stored in the memory wherein the memory stores instructions that:
generate a random identifier in response to a request using the PIN;
render the random identifier to the user, wherein the random identifier is
rendered as an image formatted using various styles; receive information from the user; and
determine if the information received sufficiently demonstrates knowledge of the PIN.

* * * * *